Nov. 13, 1928.
R. THORNER
1,691,140
ANTISKID DEVICE FOR MOTOR VEHICLES
Filed April 6, 1925
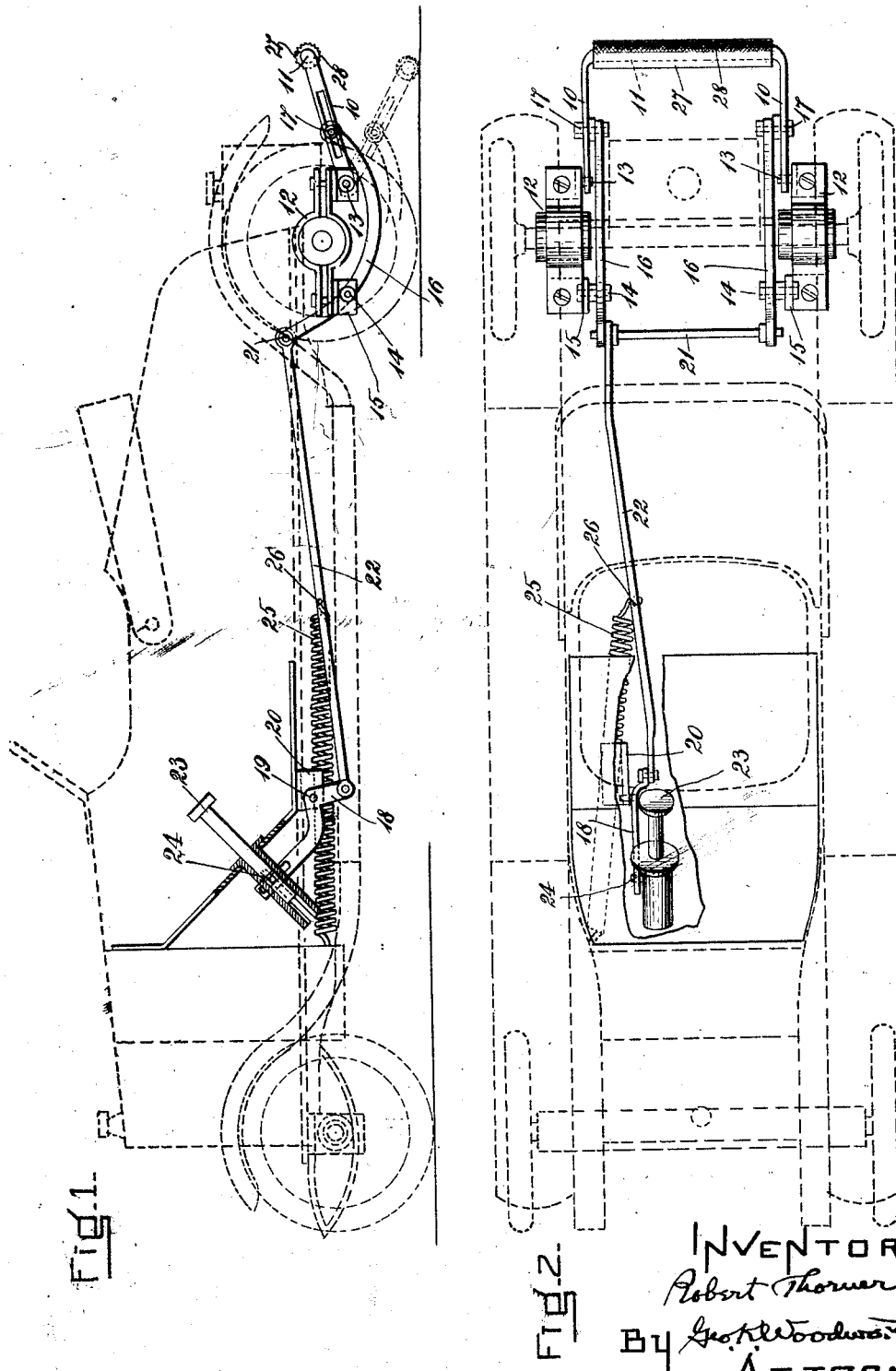

Patented Nov. 13, 1928.

1,691,140

UNITED STATES PATENT OFFICE.

ROBERT THORNER, OF ASHEVILLE, NORTH CAROLINA.

ANTISKID DEVICE FOR MOTOR VEHICLES.

Application filed April 6, 1925. Serial No. 20,943.

My invention relates to anti-skid devices for motor vehicles and its object is to provide a simple device, comprising a drag member adapted to be brought into contact with the roadway when the vehicle passes out of the driver's control, for restraining uncontrolled vehicle motion.

Anti-skid devices of this general character have been proposed in which wheels, discs, friction plates and the like, each having its transverse dimension small compared to the width of the vehicle, are arranged to be brought into contact with the roadway, but so far as I am advised, such devices have never gone into practical use.

The salient feature of my invention is a drag member pivotally attached to the car near the rear end thereof and extending transversely of said car substantially from one side of the frame to the other, together with means under the control of the operator whereby said drag, which is normally in elevated position, may be brought into contact with the roadway with sufficient force to check the uncontrolled motion of the vehicle.

My invention comprises, among other things, a rearwardly extending frame of which said transversely extending drag forms a part, or to which said drag is attached, said frame being pivoted to the vehicle, a pair of curvilinear levers, each pivotally connected to the vehicle at a point intermediate its ends, a connection from the rearward end of said curvilinear levers to the arms of said frame, respectively, a transverse bar connecting the forward ends of said curvilinear levers, a lever such as a bell crank, for example, pivotally connected to the vehicle near the forward end thereof, a rod connecting the lower end of said bar lever to said transverse bar, and means such as a pedal for rotating said lever about its pivot, whereby the force exerted by the driver on said pedal is transmitted to said drag by a series of multiplying levers and the said drag held firmly in contact with the roadway.

One embodiment of my invention is shown in the drawings which accompany and form a part of this specification in which—

Figure 1 is a side view of an anti-skid device embodying my invention, the motor vehicle being shown in outline, and Fig. 2 is a plan view of the same.

In the particular drawings selected for more fully disclosing my invention and which are to be taken merely as illustrative and not as restrictive, 10 are arms connected at their rearward ends by a transverse drag member 11 shown in the present instance as integral with said arms, the arms and the drag member constituting a frame pivoted at the forward ends thereof to the vehicle frame. In the present instance a split collar 12 is attached to each of the bearings of the rear axle, and the forward ends of the arms 10 are pivotally connected, as shown at 13, to plates depending from the flanges of said collar. It is to be understood of course that the said frame may be attached pivotally to any suitable stationary part of the vehicle frame.

Pivotally connected at 14 to plates 15 depending from the forward flanges of said collar are a pair of curvilinear levers 16, the rearward upturned end of each of said levers having a pin-and-slot connection 17 with the arms 10, respectively.

A lever such as the bell crank 18 is pivotally connected to the vehicle as shown at 19 at a point near the forward end thereof. In the present instance the said pivotal connection is made with a bracket 20 depending from the floor of the car. The lower end of said lever 18 is connected with the forward ends of the curvilinear lever 16 in any suitable manner to transmit the motion of the lever 18 to the drag 11. In the present instance the forward ends of the curvilinear levers are connected by the transverse bar 21, and a longitudinal rod 22 is articulated between the lower end of said lever 18 and said transverse bar.

Means are provided whereby the lever 18 may be actuated by the driver, and in the present instance I have shown a foot pedal or treadle 23 having a pin-and-slot connection, as indicated at 24, with the upper end of said lever 18. It is to be understood of course that I do not limit myself to this arrangement and that any suitable foot or hand-operated mechanism may be employed for actuating the lever 18.

A retractile spring 25 having its ends connected to one of the members of the system of levers and to a stationary portion of the vehicle, respectively, is employed to maintain the moving parts normally in the positions shown. For the purpose of illustration the spring has one end connected at 26 to the longitudinal rod 22 and the other to the vehicle frame near the forward end thereof.

Preferably the drag member 11 is enclosed in a sheathing 27 of wear-resisting material, such as steel, and the outer surface thereof which comes in contact with the roadway may be corrugated or serrated peripherally as indicated at 28.

As will be obvious, the actuation of the treadle 23 will bring the drag member into contact with the roadway and restrain the vehicle from lateral movement on slippery roads under conditions where the service and emergency brakes would be ineffective.

Having its length substantially equal to the width of the car, the said drag member will be effective for its intended purpose in cases where wheels, friction plates and the like of small transverse dimensions, would be inoperative. Furthermore, my improved drag member which, as aforesaid, is corrugated or serrated peripherally has its surface continuous and unbroken longitudinally, and therefore it may be employed without substantial injury to the roadway which is not the case with the prior art devices which would form deep ruts therein.

My invention is not limited to the prevention of skidding and will operate effectively as an emergency brake in case of failure of the regular vehicle brakes.

Having thus described an illustrative embodiment of my invention without, however, limiting the same thereto, what I claim and desire to secure by Letters Patent is:—

1. An anti-skid device for motor vehicles comprising in combination a rearwardly-extending frame having two arms substantially parallel to the longitudinal axis of the vehicle and a transverse drag connecting the rearward ends of said arms, means pivotally connecting the forward ends of said arms to the vehicle, a pair of curvilinear levers each pivotally connected at a point intermediate its ends to said vehicle, a pin-and-slot connection between the rearward ends of said curvilinear levers to said arms, respectively, a transverse bar connecting the forward ends of said curvilinear levers, a lever pivotally connected to said vehicle near the forward end thereof, a rod connecting the lower end of said lever to said transverse bar, a foot pedal and a pin-and-slot connection between said pedal and the upper end of said lever.

2. An anti-skid device for motor vehicles comprising in combination a rearwardly-extending frame having two arms substantially parallel to the longitudinal axis of the vehicle and a transverse drag connecting the rearward ends of said arms, means pivotally connecting the forward ends of said arms to the vehicle, a pair of curvilinear levers each pivotally connected at a point intermediate its ends to said vehicle, a pin-and-slot connection between the rearward ends of said curvilinear levers to said arms, respectively, a transverse bar connecting the forward ends of said curvilinear levers, a lever pivotally connected to said vehicle near the forward end thereof, a rod connecting the lower end of said lever to said transverse bar, and means under the control of the driver of said vehicle for actuating said rod.

In testimony whereof, I have hereunto subscribed my name this 31st day of March, 1925.

ROBERT THORNER.